United States Patent [19]

Sukup

[11] Patent Number: 5,496,108
[45] Date of Patent: Mar. 5, 1996

[54] METHOD AND MEANS FOR ADDING MOISTURE TO PARTICULATE MATERIAL

[75] Inventor: Eugene G. Sukup, Hampton, Iowa

[73] Assignee: Sukup Manufacturing Company, Sheffield, Iowa

[21] Appl. No.: 281,791

[22] Filed: Jul. 27, 1994

[51] Int. Cl.[6] .................................. B01F 5/04; B01F 7/24
[52] U.S. Cl. .................... 366/172.1; 366/261; 366/282; 366/603
[58] Field of Search ................................ 366/64, 65, 66, 366/151, 168, 172, 261, 281, 282, 287, 288, 292, 603

[56] References Cited

U.S. PATENT DOCUMENTS

| | | | |
|---|---|---|---|
| 1,513,174 | 10/1924 | Kruger . | |
| 2,861,787 | 11/1958 | Csanyi | 366/66 |
| 3,156,541 | 11/1964 | Kalke | 366/261 |
| 3,365,177 | 1/1968 | Daman | 366/168 |
| 3,580,549 | 5/1971 | Murphy | 366/261 |
| 3,727,894 | 4/1973 | Ahrenberg | 366/66 |
| 3,776,512 | 12/1973 | McKinnon | 366/261 |
| 3,817,261 | 6/1974 | Rogge . | |
| 3,841,610 | 10/1974 | Hanzawa et al. . | |
| 4,055,673 | 10/1977 | Mueller | 366/603 |
| 4,248,538 | 2/1981 | Sukup | 366/261 |
| 4,274,750 | 6/1981 | Smit . | |
| 4,381,703 | 5/1983 | Crimmins et al. . | |
| 4,664,028 | 5/1987 | Mattson | 366/603 |
| 4,836,686 | 6/1989 | Sukup . | |
| 4,854,719 | 8/1989 | Sukup . | |

Primary Examiner—David Scherbel
Assistant Examiner—Randall E. Chin
Attorney, Agent, or Firm—Zarley, McKee, Thomte, Voorhees, & Sease

[57] ABSTRACT

A machine for adding moisture to particulate material for use in a bin which has an upper portion with an elongated supporting rail thereon includes an elongated substantially horizontal support member. A rail adapter element is on the outer end of the elongated member to engage the supporting rail on the bin. A swivel support element is secured to the other end of the elongated member and is adapted to be connected to the center of the bin structure for holding the other end of the elongated member at a level position with respect to the outer end. A motor is connected to the elongated member for rotating the same about a horizontal axis. A pair of support brackets are longitudinally movably mounted on the elongated member. Mixing augers are mounted on the brackets and extend downwardly therefrom. A second power element on the support brackets serve to rotate the mixing augers about a vertical axis. Fluid nozzles are mounted on the support brackets adjacent to the mixing augers and are connected to a source of fluid. A control element is connected to the motor and the second power element and to the fluid nozzles to cause rotation of the elongated member. The control element is also connected to the fluid nozzles to cause fluid to flow therethrough onto the particulate material in the bin while the mixing augers are moving through the particulate material.

9 Claims, 4 Drawing Sheets

METHOD AND MEANS FOR ADDING MOISTURE TO PARTICULATE MATERIAL

BACKGROUND OF THE INVENTION

Most grains cannot be stored when they possess a moisture content of more than 15%. While "dry" corn is suitable for animal feed at this reduced moisture level, other grains, such as rice, does not cook well at that reduced moisture level. Accordingly, it is necessary to add moisture to rice so that the moisture content thereof is at the 17% level to obtain optimum cooking conditions.

Current devices and methods for re-moisturizing rice are very expensive (e.g., $45,000) and are not completely accurate, are not easy to operate, and consume considerable time and attention to function.

It is, therefore, a principal object of this invention to provide a method and means for adding moisture to particulate material, such as grains, which is economical to make and to operate; which is fully automatic in its operation; which is relatively fast in its functioning; and which can be operated by an average person with a reasonable amount of training.

These and other objects will be apparent to those skilled in the art.

SUMMARY OF THE INVENTION

The machine of this invention for adding moisture to particulate material for use in a bin which has an upper portion with an elongated supporting rail thereon includes an elongated substantially horizontal support member. A rail adapter element is on the outer end of the elongated member to engage the supporting rail on the bin. A swivel support element is secured to the other end of the elongated member and is adapted to be connected to the center of the bin structure for holding the other end of the elongated member at a level position with respect to the outer end.

A motor is connected to the elongated member for rotating the same about a horizontal axis. A pair of support brackets are longitudinally movably mounted on the elongated member. Mixing augers are mounted on the brackets and extend downwardly therefrom. A second power means on the support brackets serve to rotate the mixing augers about a vertical axis.

Fluid nozzles are mounted on the support brackets adjacent to the mixing augers and are connected to a source of fluid. A control means is connected to the motor and the second power means and to the fluid nozzles to cause rotation of the elongated member. The control means is also connected to the fluid nozzles to cause fluid to flow therethrough onto the particulate material in the bin while the mixing augers are moving through the particulate material.

The method of adding moisture to particulate material includes placing the particulate material in the lower portion of a bin; rotating vertically disposed spaced augers about a longitudinal axis, and moving said augers in concentric paths through the particulate material. Moisture is then sprayed on the upper surface of the particulate material adjacent the augers. By utilizing a computer, the existing moisture content of the particulate material is determined; the desired amount of moisture content of the particulate material is then registered in the computer; the computer then determines the quantity of the particulate material; and then calculates the amount of moisture to be added to achieve the desired moisture content. When that desired moisture content is achieved, the computer stops spraying moisture on the particulate material.

A BRIEF DESCRIPTION OF THE DRAWINGS

DESCRIPTION OF THE PREFERRED EMBODIMENT

Figure 1:
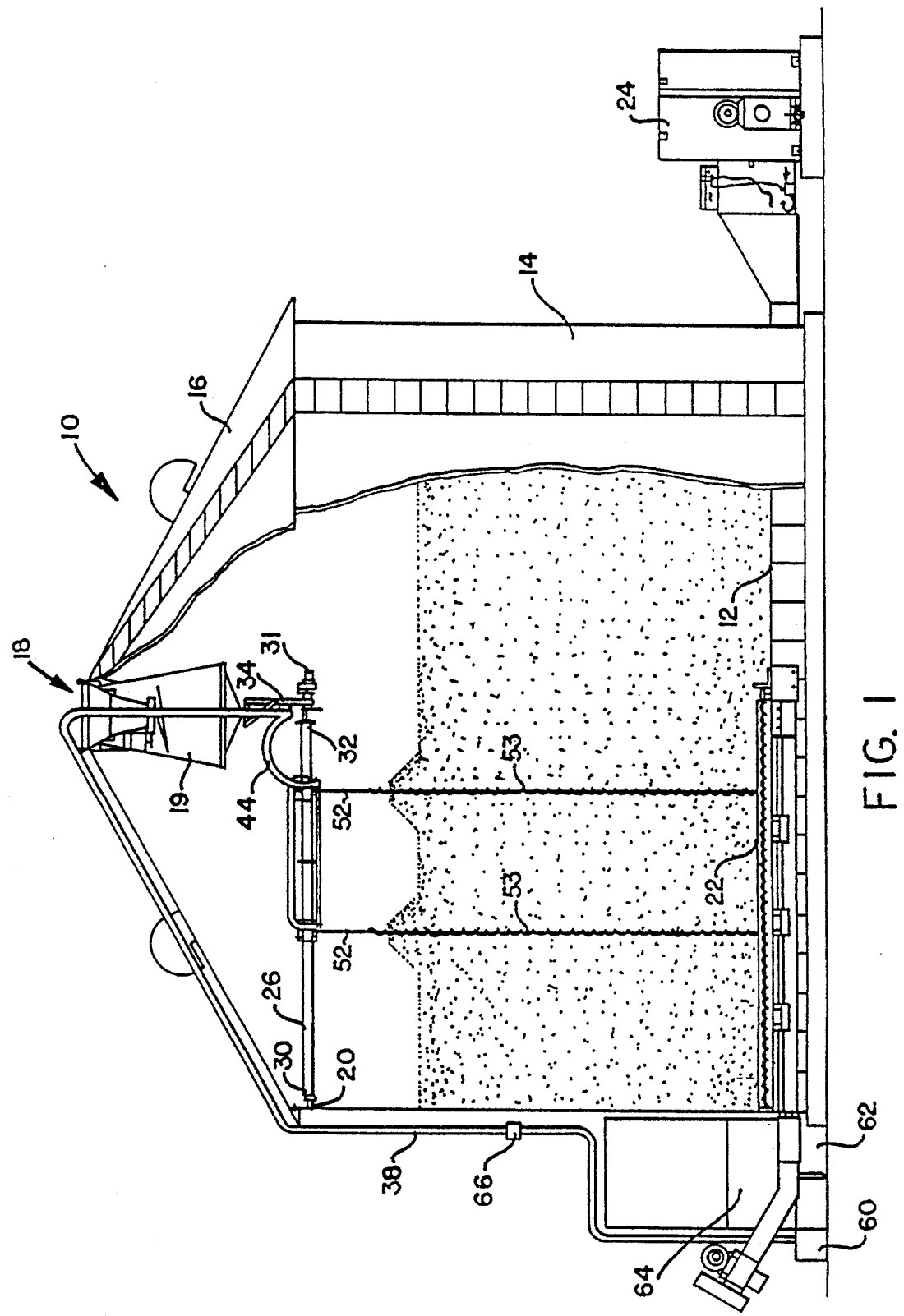
FIG. 1 is a partial vertical sectional view showing the schematic layout of the apparatus of this invention.

Grain stirring and aeration devices are old in the art and are typically illustrated by the following U.S. Pat. Nos.:

4,274,750

4,836,686

4,854,719

The numeral 10 represents a conventional grain bin with a hollow floor 12, vertical cylindrical sidewalls 14, and a roof 16 with a grain opening 18 at the apex thereof. A conventional grain spreader 19 is mounted in opening 18. A circular rail 20 is secured to the inner surface of the sidewalls 14 and extends around the upper portion of the interior of the bin. A conventional sweep auger 22 is mounted on top of the hollow floor 12, and a fan 24 is connected to the space under floor 12 to provide forced air to the interior of the bin.

An elongated roll member 26 has a rail adapter 28 on its outer end 30 and a conventional electric motor 31 mounted on the inner end 32. A bracket 34 is secured to the inner end of the roll member 26 and is secured to the top of the bin in any convenient way.

Figure 2:
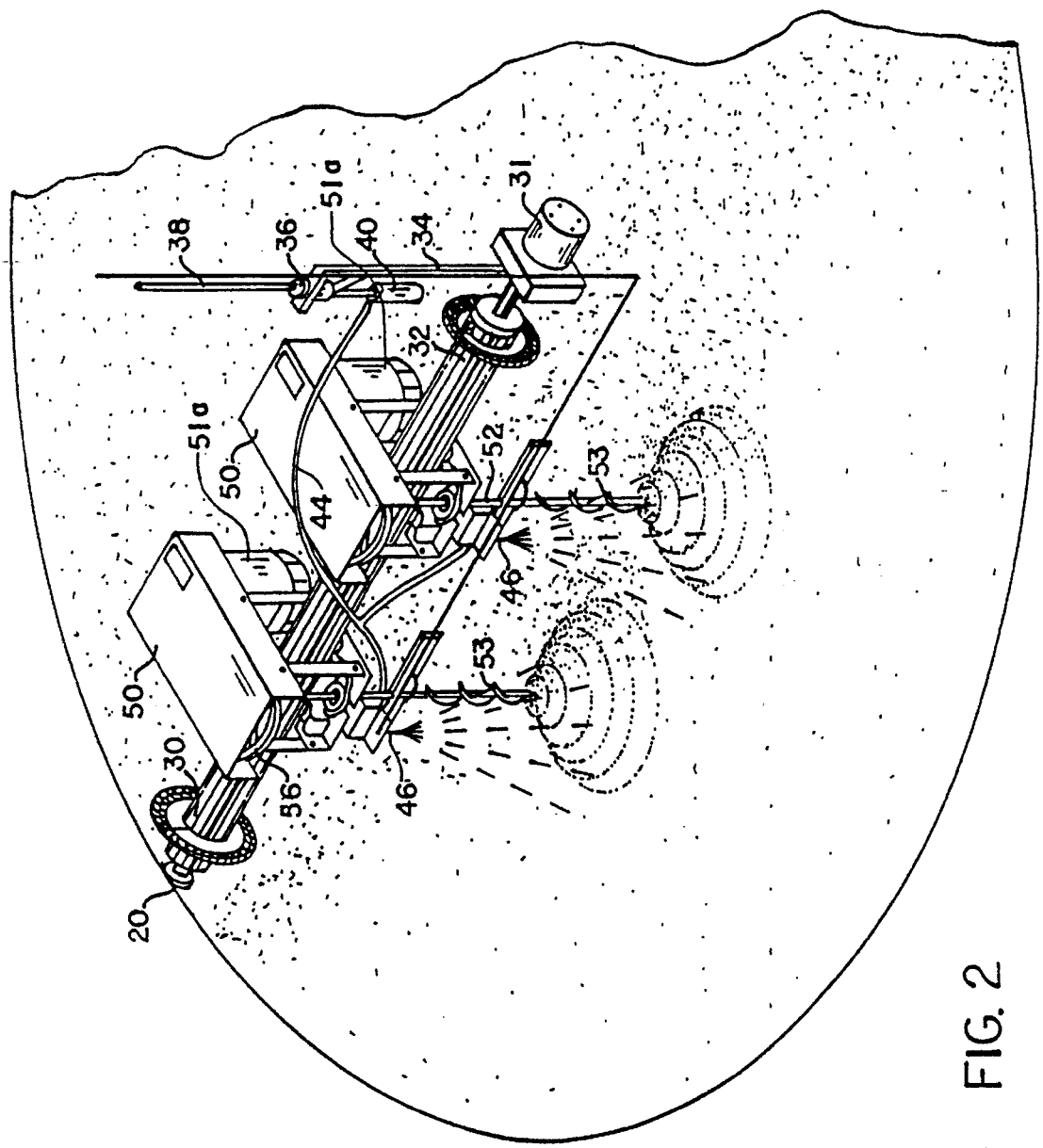
FIG. 2 is an upper perspective view of the apparatus of this invention as mounted in the upper portion of a grain bin.
Figure 3:
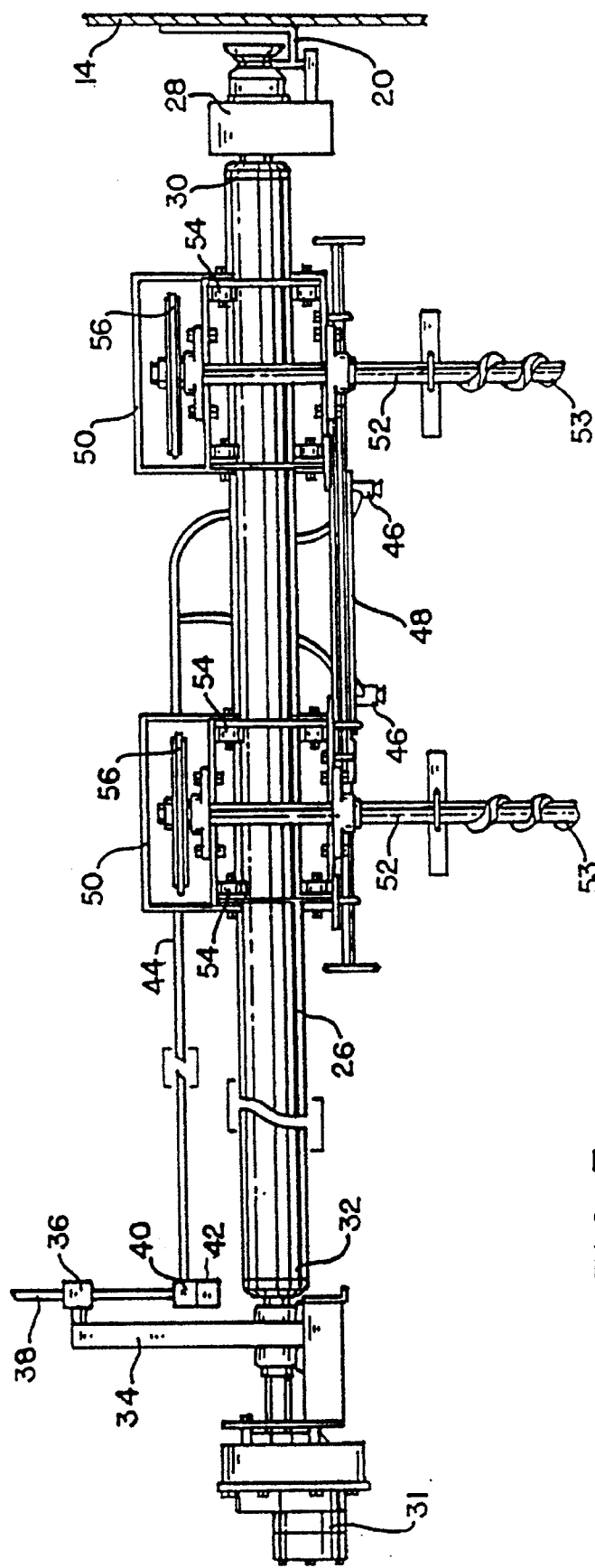
FIG. 3 is an enlarged scale elevational view of the stirring and moisture delivery system of the invention.

An elongated fluid conduit 38 extends through bearing support 36 and terminates in swivel 40. A solenoid valve 42 is attached to swivel 40 and is adapted to open and close the fluid passageway in swivel 40. A fluid line 44 extends from the output side of swivel 40 and is connected to nozzles 46 which are mounted on brackets 48 (FIG. 3) which extends between auger support brackets 50 which in turn are mounted on the elongated roll member 26. The auger support brackets 50 support elongated auger shafts 52 by their upper end. The auger shafts are adapted to mix particulate material by means of a flighting 53 spirally wound on the outer surface thereof. Rollers 54 are mounted on brackets 50 and engage roll member 26 and serve the same purpose as they serve in the aforementioned patents. Belt drives 56 are mounted on the upper ends of auger shafts 52 and can be driven by a suitable source of power (i.e., motors 51A, FIGS. 2 and 4).

Figure 4:
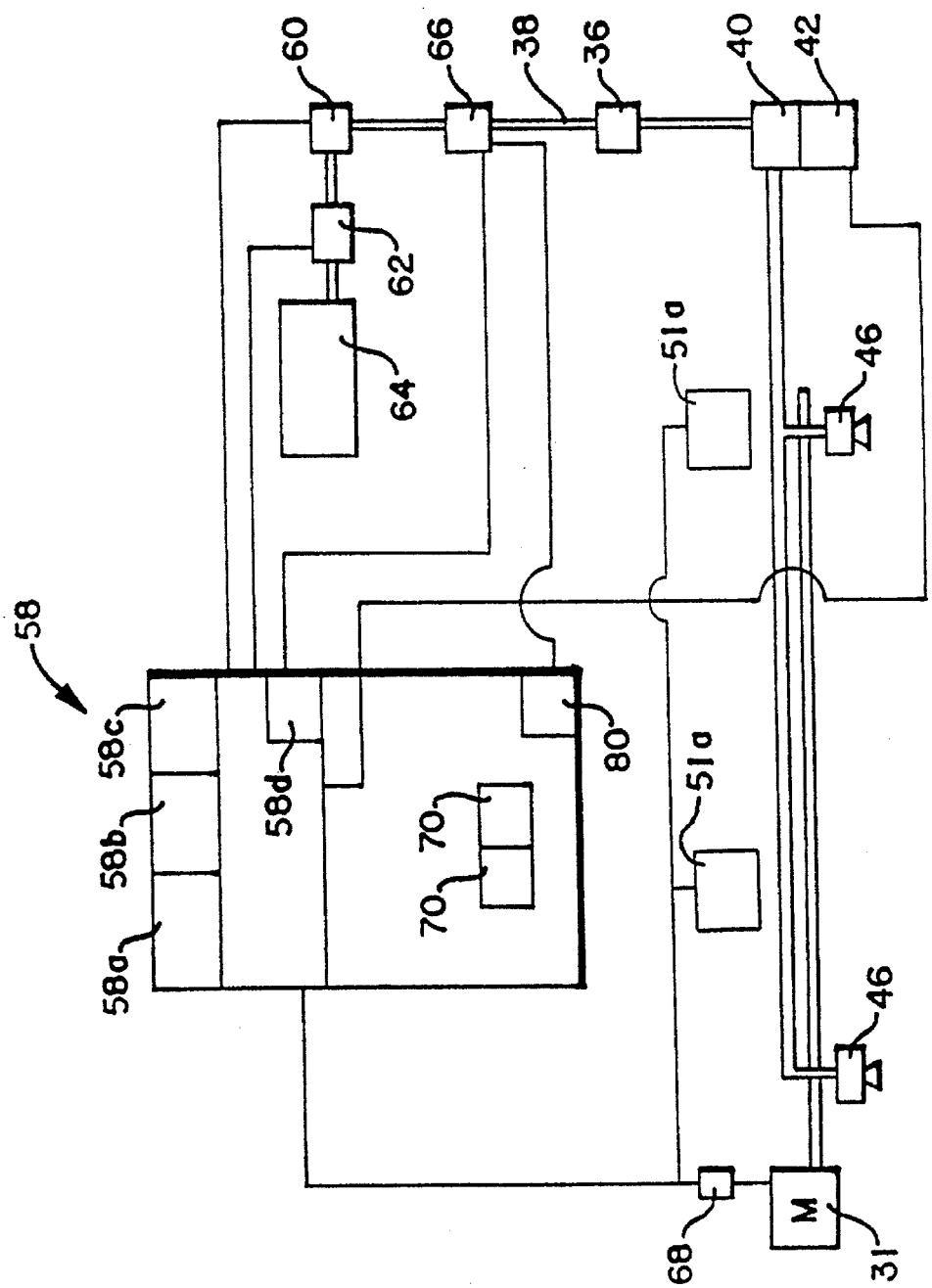
FIG. 4 is a block diagram of the computer which controls the various components of the system.

With reference to FIG. 4, a computer 58 has input stations 58a, 58b, and 58c to receive such information as the existing moisture of the particulate material in the bin, the desired ending moisture, and the number of bushels or volume of the particulate material to be moistened. Computer 58 has a calculator 58d which calculates the pounds of moisture to be added to the particulate material after taking into account the amount of particulate material, the moisture content thereof, and the amount of water desired in the final mix. The computer 58 can be activated to in turn activate pump 60 which pumps water through fluid regulator 62 and into fluid conduit 38. When in operation, the pumped fluid then proceeds through support bearing 36 and thence to swivel 40. If solenoid valve 42 is open, the fluid proceeds through fluid conduit 44 to nozzles 46 where the fluid is dispensed in the form of a mist. The solenoid valve 42 will cut off the water flow if the motor 31 is stopped by a mercury switch 68 which detects a lag in one of the auger shafts 52. The swivel 40 allows the device to move around the interior of the bin without the conduit 38 or the conduit 44 becoming twisted.

The fluid flow sensor 66 is a Micro Trak FM 500 flow sensor. The sensor 66 is input to a counter and a frequency to voltage converter. (Not shown). The current reflects the current flow rate. The flow rate can be changed according to operating conditions. The computer continually displays the gallons yet to be applied to the particulate material and the current flow rate through the display window 70 (FIG. 4).

The computer 58 adjusts the regulator 62 to maintain the desired flow rate. The regulator 62 is a bypass and a valve. The bypass allows the excess water from the pump to flow back into the reservoir 64. The valve is operated by the computer to produce less flow to the nozzles in the bin as required.

When the counter 80 (FIG. 4) reaches the calculated value, all the water has been added and the pump 60 is shut off.

While the drawings depict use of the invention in a round bin, the device of the invention could also be moved transversely across the width or length of a rectangular bin.

Moisture is added to rice just prior to being packaged. This invention and the method and apparatus thereof permit rice to be quickly and easily moisturized at a cost of approximately $5,000 as compared to much more expensive equipment. Accordingly, it is seen that this invention will achieve at least all of its stated objectives.

What is claimed is:

1. A machine for adding moisture to particulate material for use in a bin having an upper portion with an elongated supporting rail means, comprising, an elongated substantially horizontal support member having outer and inner ends, a rail adapter means on said outer end of said support member, a support means secured to said inner end of said support member and adapted to be connected to a bin structure for holding said inner end of said support member at a level position with respect to said outer end, first power means connected to said support member for rotating said support member about a horizontal axis, at least a pair of support brackets mounted on said support member, downwardly extending elongated mixing augers rotatably mounted on said support brackets, second power means on said support brackets for rotating said mixing augers about a vertical axis, fluid nozzles mounted on said support brackets adjacent to said mixing augers, and control means connected to said first and second power means and to said fluid nozzles, to cause rotation of said elongated member, and being operatively connected to said fluid nozzles to cause fluid to flow therethrough onto particulate material in said bin while said mixing augers are moving through said particulate material.

2. The device of claim 1 wherein said support means is a swivel support.

3. The device of claim 1 wherein said elongated member is adapted to rotate in a horizontal plane about said support means.

4. The device of claim 1 wherein said control means is a computer.

5. The device of claim 4 wherein a fluid pump is connected to said control means, a fluid line connecting said fluid pump and said fluid nozzles, wherein said fluid pump can supply a source of fluid through said fluid line to said fluid nozzles, and a flow sensor in said fluid line connected to said control means whereby said control means can control the amount of fluid supplied to said fluid nozzles from said fluid pump.

6. The device of claim 4 wherein said control means includes input means to receive data relative to starting moisture of the particulate material in the bin, desired ending moisture, and the quantity of material to moisten.

7. The device of claim 6 wherein said control means includes means to calculate the amount of particulate material in the bin, the existing moisture content thereof, and the weight of the water to add to said particulate material to obtain said desired moisture.

8. The device of claim 7 wherein said control means includes a stop means to stop fluid flow when said desired ending moisture is attained.

9. A machine for adding moisture to particulate material for use in a bin having an upper portion with an elongated supporting rail means, comprising, an elongated substantially horizontal support member, means on the upper portion of said bin member for movably supporting said support member and holding said support member in a substantially horizontal position, first power means connected to said support member for moving said member with respect to said bin, at least a pair of support brackets mounted on said support member, downwardly extending elongated mixing augers rotatably mounted on said support brackets, second power means on said support brackets for rotating said mixing augers about a vertical axis, fluid nozzles mounted on said support brackets adjacent to said mixing augers, and control means connected to said first and second power means and to said fluid nozzles, to cause rotation of said support member, and being operatively connected to said fluid nozzles to cause fluid to flow therethrough onto particulate material in said bin while said mixing augers are moving through said particulate material.

* * * * *